(12) United States Patent
Barmore (10) Patent No.: US 7,032,050 B2
(45) Date of Patent: Apr. 18, 2006

(54) METHOD FOR CONTROL OF CODECS IN PC RISER CARD ARCHITECTURES

(75) Inventor: Brad A. Barmore, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 09/964,805

(22) Filed: Sep. 28, 2001

(65) Prior Publication Data

US 2003/0070023 A1    Apr. 10, 2003

(51) Int. Cl.
G06F 13/00 (2006.01)
H05K 7/10 (2006.01)

(52) U.S. Cl. ........................ 710/301; 710/104
(58) Field of Classification Search .............. 710/8, 710/10, 11, 104, 105, 300, 301; 713/1, 100
See application file for complete search history.

(56) References Cited

U.S. PATENT DOCUMENTS

| | | | |
|---|---|---|---|
| 6,401,152 B1 * | 6/2002 | Solomon et al. ............. 710/104 |
| 6,434,633 B1 * | 8/2002 | Braun et al. .................. 710/15 |
| 6,466,584 B1 * | 10/2002 | Maxwell et al. ............ 370/465 |
| 6,529,975 B1 * | 3/2003 | Miller et al. ................... 710/64 |
| 6,597,702 B1 * | 7/2003 | Caugherty .................... 370/410 |
| 6,609,170 B1 * | 8/2003 | Lehwalder et al. .......... 710/301 |
| 6,611,912 B1 * | 8/2003 | Maleck et al. ............... 713/100 |
| 6,671,748 B1 * | 12/2003 | Cole et al. ....................... 710/8 |
| 2003/0204657 A1 * | 10/2003 | Lehwalder et al. .......... 710/301 |

FOREIGN PATENT DOCUMENTS

EP        1089164 A2 *  9/2000

OTHER PUBLICATIONS

"Audio Codec '97" Revision 2.1, Intel, May 22, 1998, pp. 1-108.*
"Audio Codec '97" Revision 2.2, Intel, Sep. 2000, pp. 1-105.*

* cited by examiner

Primary Examiner—Paul R. Myers
(74) Attorney, Agent, or Firm—Crystal D. Sayles (57) ABSTRACT

A communications and networking riser includes a plurality of riser codecs and an adaptive initialization module coupled to the riser codecs. The initialization module configures the riser codecs when the riser is connected to a motherboard having a codec controller and a primary codec. The initialization module automatically selects between a two-codec configuration and a three-codec configuration based on a codec support capability of the codec controller.

22 Claims, 7 Drawing Sheets

METHOD FOR CONTROL OF CODECS IN PC RISER CARD ARCHITECTURES

CROSS REFERENCE TO RELATED PATENT APPLICATIONS

This instant patent application relates to U.S. patent application Ser. No. 09/333,119, filed on Jun. 14, 1999; and U.S. patent application Ser. No. 09/474,429, filed on Dec. 29, 1999.

BACKGROUND OF THE INVENTION

1. Technical Field

The present invention generally relates to personal computer (PC) riser card architectures. More particularly, the invention relates to a riser having the ability to automatically select between a first multi-codec configuration and a second multi-codec configuration based on a codec support capability of a controller located on a motherboard.

2. Discussion

As the demand for a feature-rich computing environment continues to grow, various devices and systems have evolved to provide enhanced communication and greater mobility. For example, personal digital assistants (PDAs), wireless phones and personal computers (PCs) have all attempted to enhance communication and network functionality in some form or fashion. Indeed, the typical PC includes numerous communication subsystems in order to serve the audio, modem, and local area networking (LAN) needs of the consumer.

The conventional audio, modem or LAN application requires a coder-decoder (codec) to convert analog signals into a digital form for transmission to processing components within the PC. The codec also converts the digital signals back into an analog signal for replay over an analog channel such as a telephone line, speaker connection or networking connection. A codec controller serves as an interface between the processing components of the PC and the codec in order to implement the various features of the particular application.

It is important to note that, as the demand for applications increases so does the number of codecs communicating with the codec controller. For example, three 2-channel codecs are required in order to support six channels of "Surround Sound" audio. By integrating the codec controller and various codecs into the motherboard, less space (i.e., real estate) is available for other components. Furthermore, such an approach works against the current trend to reduced costs at all levels of the PC platform. It has additionally been determined that such an approach has the potential for increased noise, which in turn degrades the performance of each system and makes certification with authorities such as the FCC more difficult.

Thus, while earlier PCs traditionally integrated many of the above communication subsystems into the motherboard, cost, space and certification concerns dictate an alternative solution. One such solution involves the segregation of certain communication subsystems and features through the use of risers (or riser cards). A riser typically includes a printed wiring board (PWB) that is coupled through a connector (or slot) to the motherboard in a perpendicular arrangement in order to physically separate noise-sensitive systems (such as codecs) from the noisy environment of the motherboard. The riser therefore has a riser codec architecture that communicates with the codec controller resident on the motherboard. It is important to note that earlier implementations involved placing a primary codec on the motherboard and designing the riser codec architecture to incorporate a single riser codec. Thus, the codec controller could support up to two codecs when the communications riser was installed and up to one codec when the riser was not installed (unless the second codec was integrated into the motherboard). The details of such an approach can be found in Communication and Networking Riser Specification, Revision 1.1 by Intel Corporation, Oct. 18, 2000.

As the aforementioned demand for features continues to grow, however, it has been determined that it is desirable to provide multiple codecs on the communications riser. Thus, by designing the codec architecture to include two codecs instead of one, the codec controller can be configured to support up to three codecs. It should be noted, however, that systems with codec controllers having the capability to support a maximum of two codecs still exist. Thus, there is a need for a communications riser having two codecs to be able to configure itself based on the codec support capability of the codec controller resident on the motherboard. Such an ability to be backward (and forward) compatible would significantly enhance the marketability of the communications riser and would ultimately reduce design and manufacturing costs.

BRIEF DESCRIPTION OF THE DRAWINGS

The various advantages of the present invention will become apparent to one skilled in the art by reading the following specification and appended claims, and by referencing the following drawings, in which:

DETAILED DESCRIPTION OF THE PREFERRED EMBODIMENTS

A riser and method of configuring a plurality of riser codecs in accordance with the present invention therefore provides a number of benefits. The riser includes a plurality of riser codecs and an adaptive initialization module coupled to the riser codecs. The initialization module configures the riser codecs when the riser is connected to a motherboard having a codec controller and a primary codec. The initialization module automatically selects between a first multi-codec configuration and a second multi-codec configuration based on a codec support capability of the codec controller.

In another aspect of the invention, an adaptive initialization module of a riser includes a detection module and an address controller coupled to the detection module. The detection module monitors the status of a signal, where the address controller selects a two-codec address structure when the signal status indicates that the codec controller supports up to two codecs. The address controller selects a three-codec address structure when the signal status indicates that the codec controller supports up to three codecs. In one approach, the signal status indicates whether data is to be delivered from a primary codec to the codec controller.

Further in accordance with an embodiment of the present invention, a method of configuring a plurality of riser codecs includes monitoring the status of a signal where the signal status indicates whether data is to be delivered from a primary codec to a codec controller. The method further provides for selecting a two-codec address structure when the signal status indicates that the codec controller supports up to two codecs. A three-codec address structure is selected when a signal status indicates that the codec controller supports up to three codecs.

In another aspect of the invention, a computer-readable storage medium storing a set of instructions is provided. The set of instructions is capable of being executed by a processor to configure a plurality of riser codecs. The method provides for monitoring the status of a signal where the signal status indicates whether data is to be delivered from a primary codec to a codec controller. A two-codec address structure is selected when the signal status indicates that the codec controller supports up to two codecs. A three-address structure is selected when the signal status indicates that the codec controller supports up to three codecs.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

Figure 1:
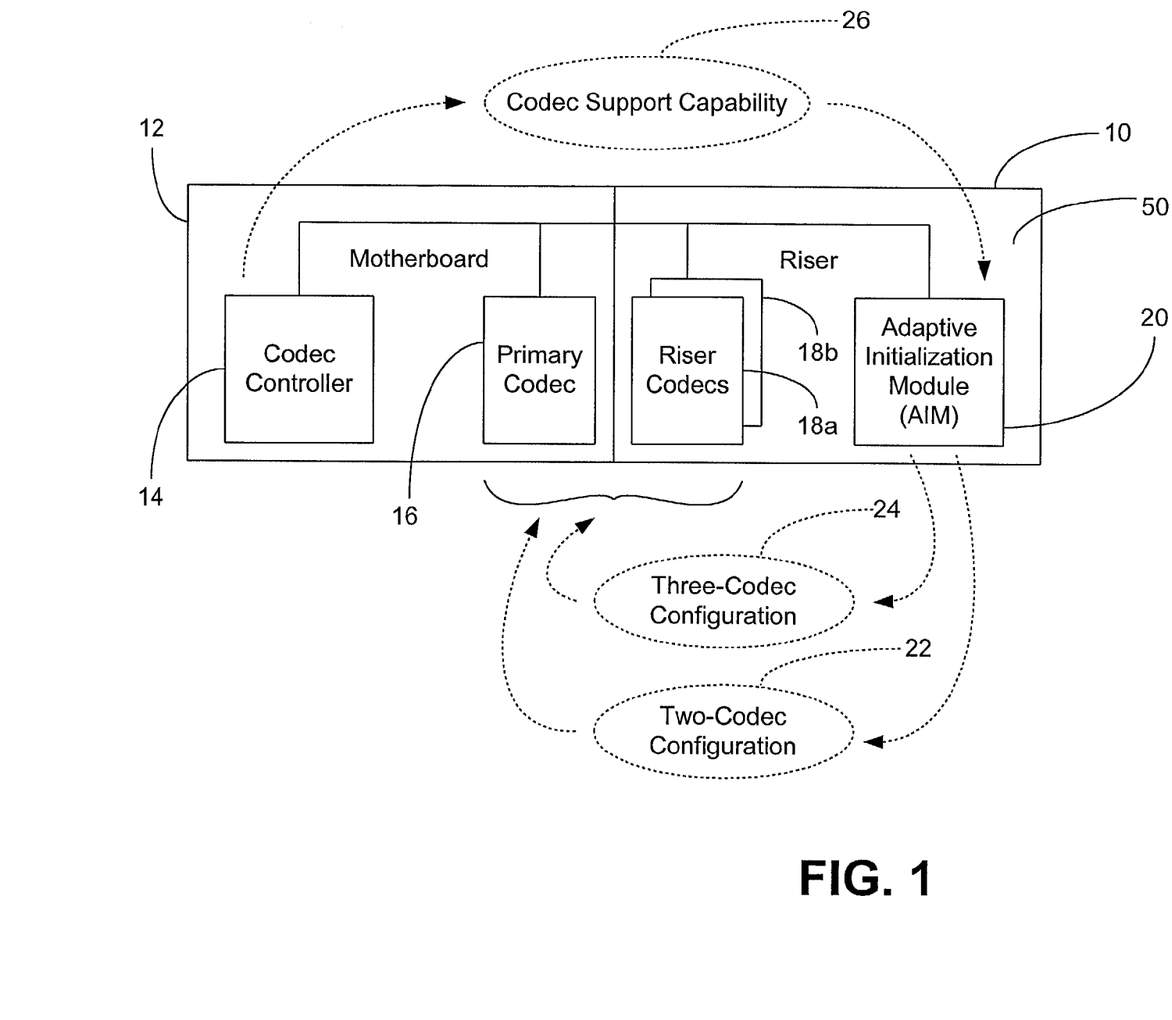
FIG. 1 is a block diagram demonstrating an example of automatic selection between codec configurations in accordance with one embodiment of the present invention.

FIG. 1 shows an improved riser 10 having the ability to configure itself on the fly. The riser 10 generally supports networking functions and supports the audio, modem and local area network (LAN) interfaces of core logic chip sets. The riser 10 connects to a motherboard 12, where the motherboard 12 has a codec controller 14 and a primary codec 16. The technology and operation of PC codecs is well documented in sources such as the "Audio Codec '97 Component Specification", Revision 1.03, Sep. 15, 1996. While the riser 10 will be primarily described with respect to a personal computer (PC), it will be appreciated that the principles described herein are not so limited. In fact, the riser 10 can be implemented in any environment in which backward compatibility is desired for codecs. Nevertheless, it will be appreciated that PC applications have a number of aspects for which the riser 10 is uniquely suited.

Generally, the riser 10 has a plurality of riser codecs 18 and an adaptive initialization module 20 coupled to the riser codecs 18. The term "coupled" is used herein in a general communication sense and is therefore not limited to any particular implementation. Thus, the initialization module 20 may communicate with the riser codecs 18 over any medium, be it electrical, optical, radio frequency (RF), or otherwise. Notwithstanding, the preferred approach is to communicate over copper traces provided in printed wiring board 50. The initialization module 20 configures the riser codecs 18 when the riser 10 is connected to the motherboard 12. It can further be seen that the initialization module 20 automatically selects between a first multi-codec configuration 22 and a second multi-codec configuration 24 based on a codec support capability 26 of the codec controller 14.

In one embodiment, the first multi-codec configuration is a two-codec configuration and the second multi-codec configuration is a three-codec configuration. It is important to note that while the invention will be primarily described with respect to two- or three-codec configurations, the principles described herein can be readily adapted to provide for selection between any number of codecs.

Figure 2:
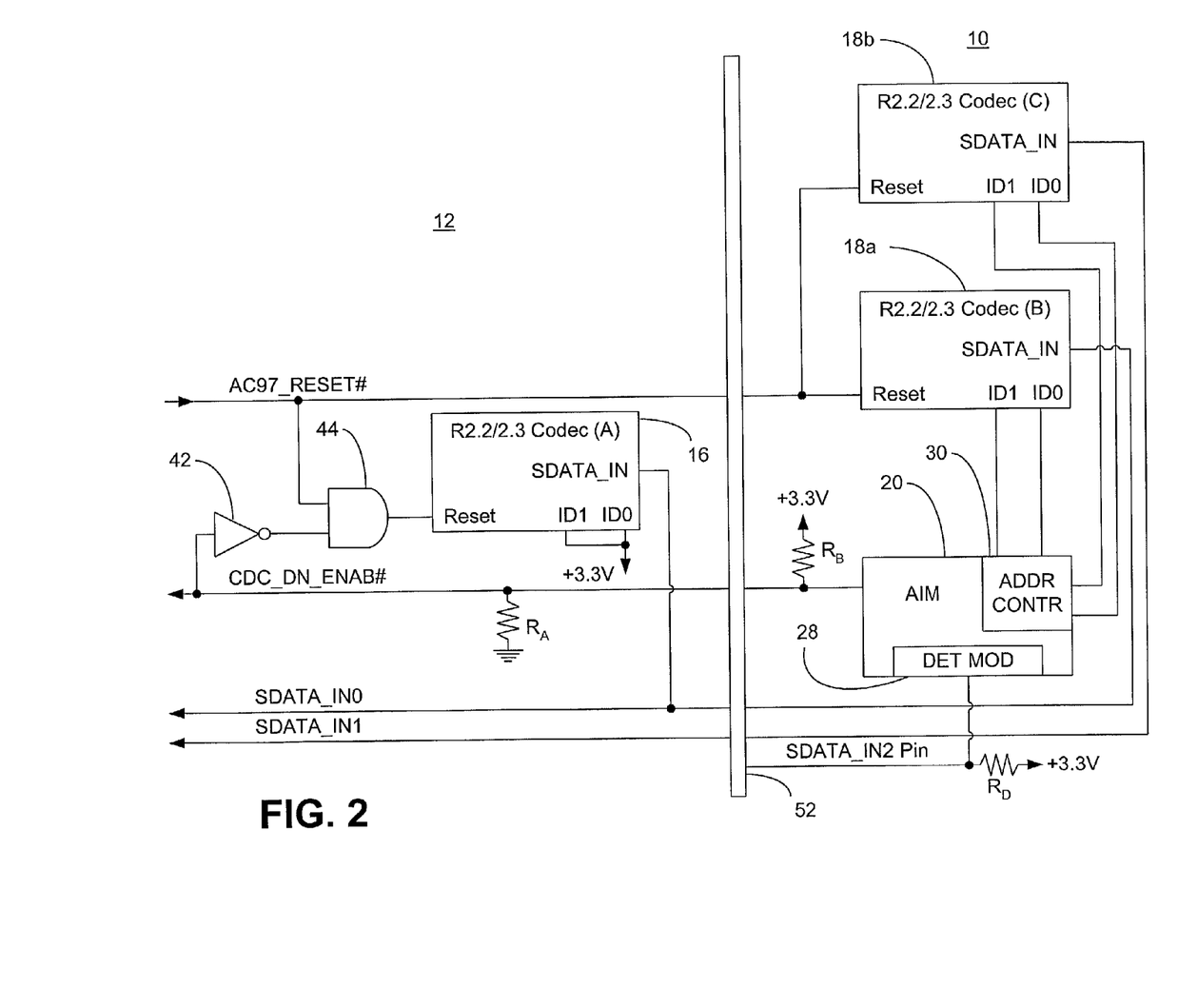
FIG. 2 is a schematic diagram showing an example of an adaptive initialization module in which the codec controller supports up to two codecs in accordance with one embodiment of the present invention.
Figure 3:
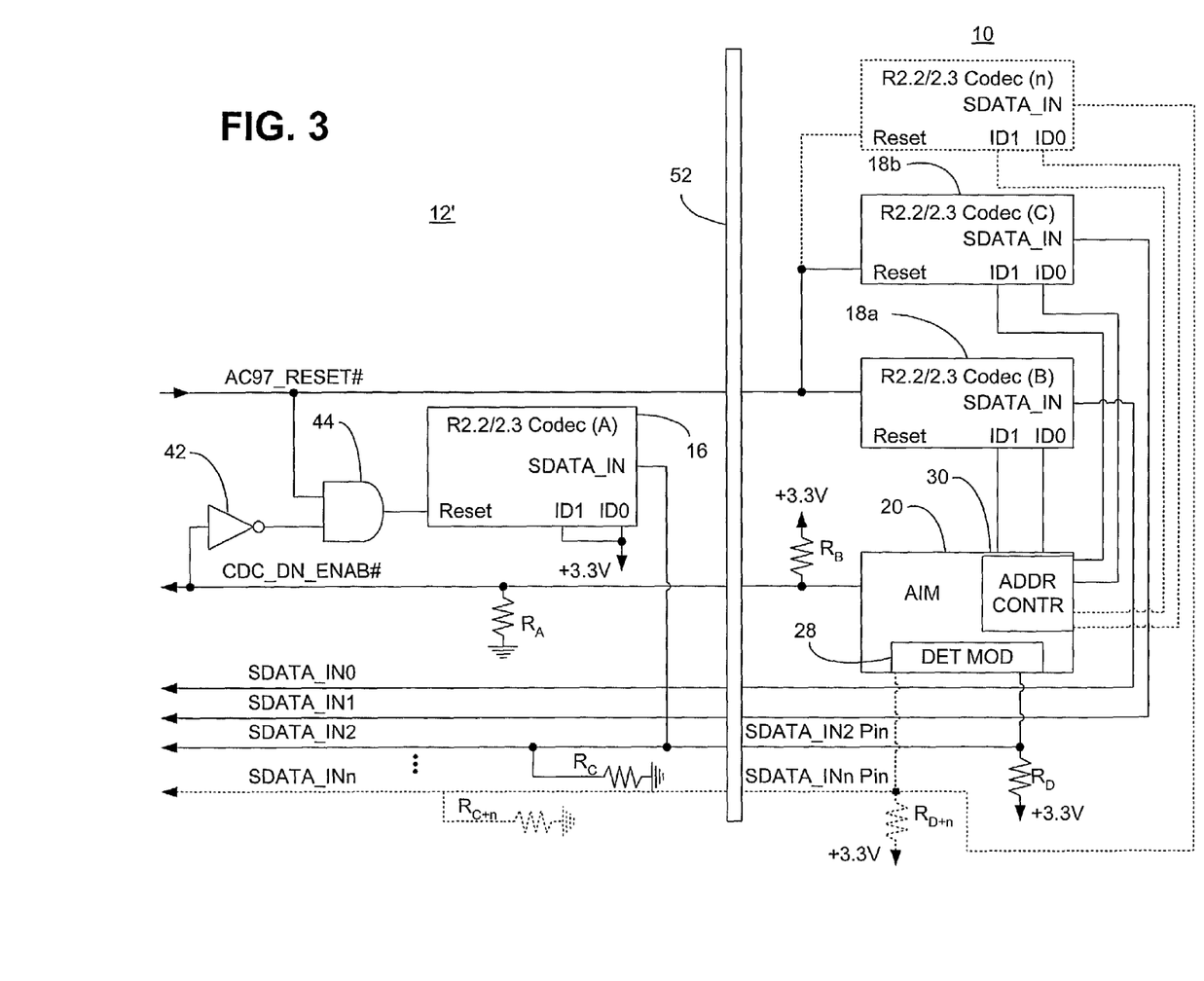
FIG. 3 is a schematic diagram showing an example of an adaptive initialization module in which the codec controller supports more than two codecs in accordance with one embodiment of the present invention.
Figure 6:
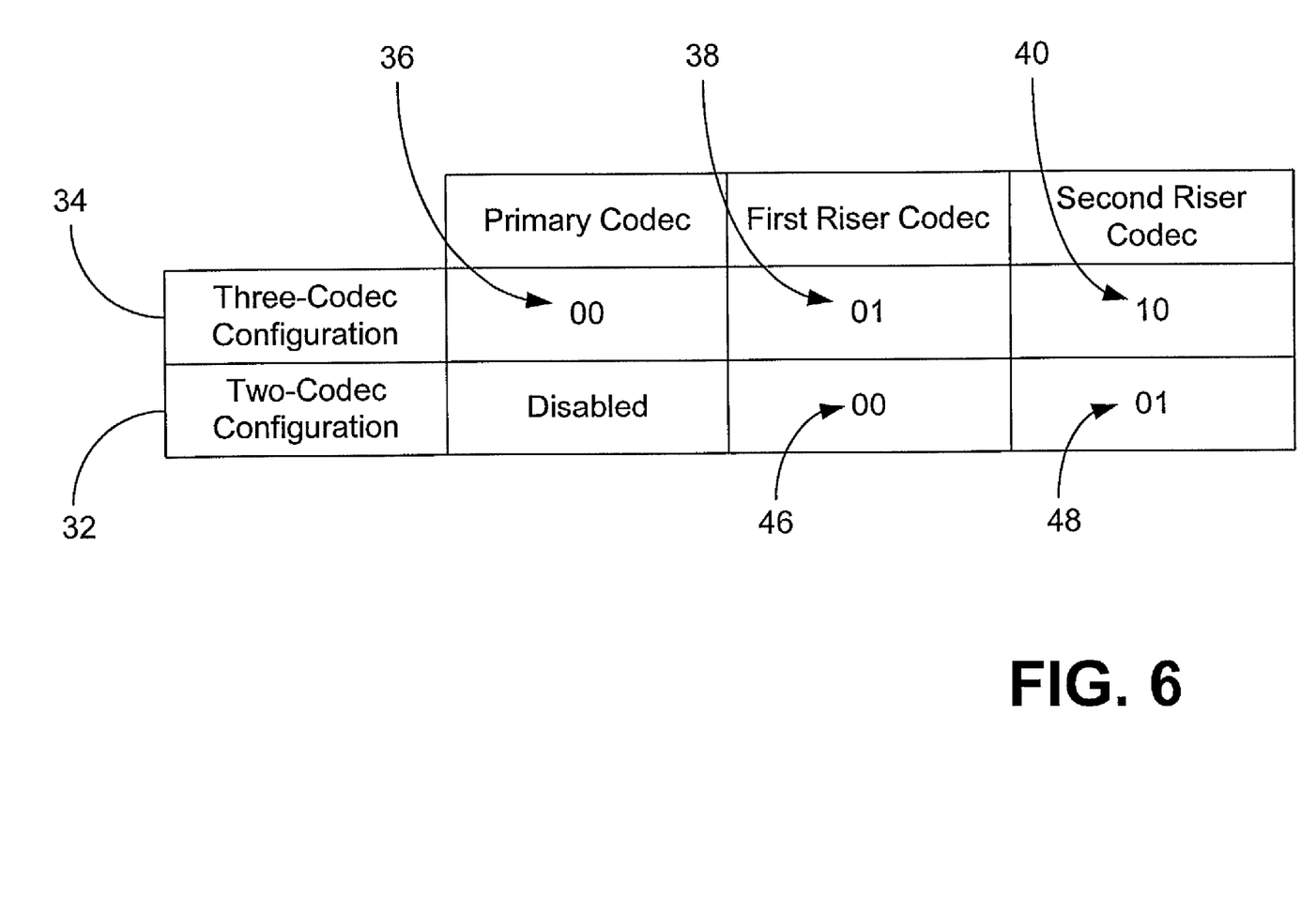
FIG. 6 is a chart showing an example of address structures in accordance with one embodiment of the invention.

Turning now to FIGS. 2 and 3, it can be seen that the initialization module 20 preferably includes a detection module 28 that monitors the status of a signal given the identifier SDATA_IN2 in this embodiment. An address controller 30 is coupled to the detection module 28 and the riser codecs 18a, 18b. FIG. 6 demonstrates that the address controller selects a two-codec address structure 32 when the signal status indicates that the codec controller supports up to two codecs. Similarly, the address controller selects a three-codec address structure 34 when the status signal indicates that the codec controller supports up to three codecs. The codec controller communicates with the codecs in accordance with the selected address structure.

With continuing reference to FIGS. 2–6, it can be seen that the three-codec address structure 34 includes a first address 36 (namely, 00) corresponding to the primary codec 16, a second address 38 (namely, 01) corresponding to the first riser codec 18a and a third address 40 (namely, 10) corresponding to the second riser codec 18b. Thus, when the initialization module 20 determines that the codec controller supports a greater number of codecs, all three codecs are given addresses. It is important to note that the particular addresses shown are for the purposes of discussion only, and that other addresses may be used without parting from the spirit and scope of the invention.

It can further be seen that the initialization module 20 uses the signal CDC_DN_ENAB# in this embodiment as an enabling mechanism that is coupled to the primary codec 16 through inverter 42 and GATE 44. The enabling mechanism disables the primary codec 16 when the codec controller supports up to two codecs. In such case, the two-codec structure 34 is used and includes a first address 46 (namely, 00) corresponding to the first riser codec 18a and a second address 48 (namely, 01) corresponding to the second riser codec 18b.

More specifically, the pull-up resistor value RB on the CDC_DN_ENAB# pin must be changed depending on the state of the SDATA_IN2 signal. Since all of the Codec address assignments and the state of CDC DN_ENAB# are set prior to bringing the Codecs out of reset, all of the state determination and address controls are performed prior to the rising edge of AC97_RESET#. Table 1 provides the truth table for setting the state of the CDC_DN_ENAB# signal based on the state of the SDATA_IN2.

TABLE 1

| SDATA IN2 State During AC'97 Reset | CDC_DN_ENAB# pull-up Resistor Value |
| --- | --- |
| Low | 100 kohm |
| High | 1 kohm |

One approach to setting a high or low value on a signal is to use pull-up and pull-down resistors, as shown in FIG. 3. The use of pull-up and pull-down resistors requires that while reset is active (low), the devices attached to the SDATA_IN2 signal do not drive the signal, otherwise a false level may be detected. Thus, after the falling edge of AC97_RESET, the state of the SDATA_IN2 signal is used to set the pull-up impedance on the CDC_DN_ENAB# signal, as previously described.

Figure 4:
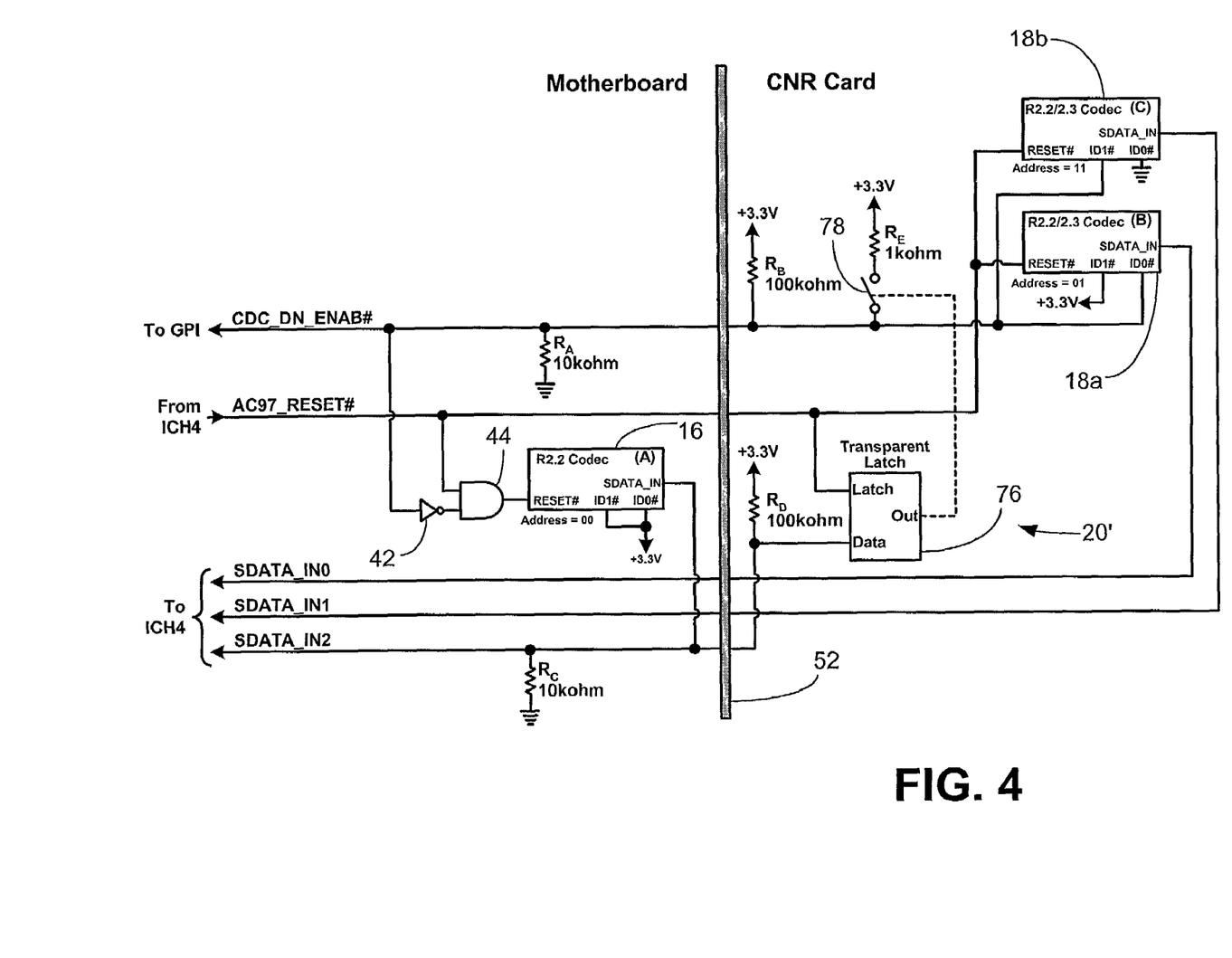
FIG. 4 is a schematic diagram showing an example of a high level implementation of an adaptive initialization module in accordance with one embodiment of the present invention.

Turning now to FIG. 4, it can be seen that the state of SDATA_IN2 can be determined by the pull-up and pull-down resistors on the SDATA_IN2 line. When SDATA_IN2 is supported by the AC '97 Controller, pull-down resistor, $R_C$ is installed on the motherboard. Since resistor $R_C$ is an order of magnitude smaller than the pull-up resistor, $R_D$ installed on the CNR card, the SDATA_IN2 signal will assume a low state. The state of SDATA_IN2 is latched, at the rising edge of AC97_RESET, by a transparent latch 76. It should be noted that while AC97_RESET is low, the transparent latch output follows the state of the Data pin, insuring that the circuit will be settled long before the rising edge of AC97_RESET. The transparent latch 76 is required to prevent the normal operation of the SDATA_IN2 signal from changing the CDC_DN_ENAB# pull-up value. The output of the transparent latch 76 is then used to control an electronic switch 78, which will remain open when SDATA_IN2 is in a low state, and closed when SDATA_IN2 is in a high state. When the electronic switch 78 is closed, the CDC_DN_ENAB# signal will be pulled high through a 1 kohm resistor, disabling the primary Codec 16.

Thus, codec address control under the present invention does not require any additional circuitry. All control can be provided through proper connections between the Codec address pins and the CDC_DN_ENAB# signal, as shown in FIG. 4. Note that the addressing is not sequential and requires that the AC '97 Controller be able to support missing/non-sequential Codec addressing.

Figure 5:
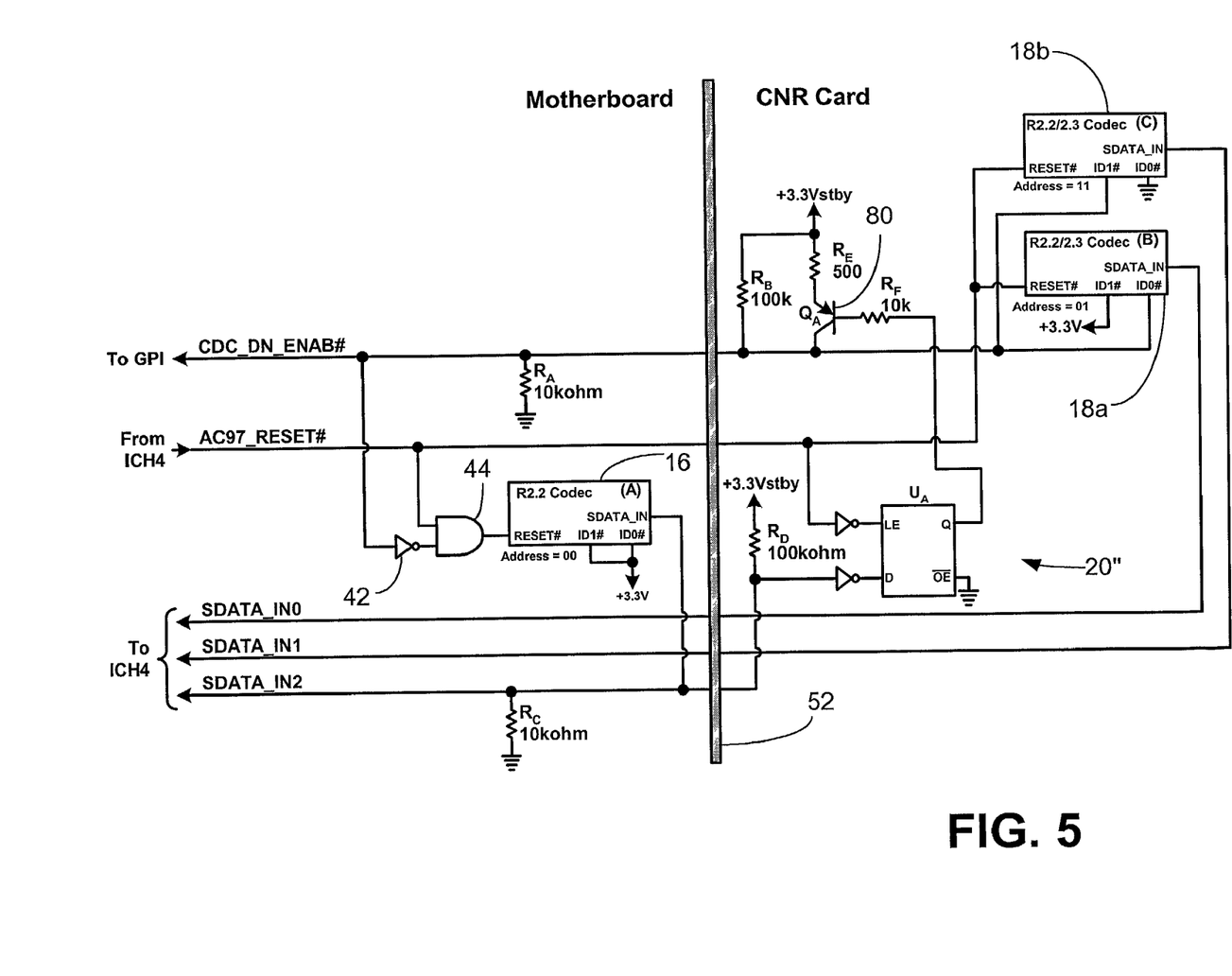
FIG. 5 is a schematic diagram showing an example of a lower level implementation of an adaptive initialization module in accordance with one embodiment of the present invention.

It will be appreciated that the actual implementation of the block diagram in FIG. 4 may require additional blocks. The schematic shown in FIG. 5 is one example of a lower level implementation of the CDC_DC_ENAB# control and Codec address circuitry, although there are many different methods that can be used. In the circuit of FIG. 5, when SDATA_IN2 is high, transistor 80 ($Q_4$) will pull the CDC_DN_ENAB# signal to about 3 Volts, resulting in the CNR mastering the AC'97 Interface, and Codec (B) at address 00b, with Codec (C) at address 01b. When SDATA_IN2 is pulled low, through $R_C$, $Q_4$ will be off and the CDC_DN_ENAB# signal will assume the appropriate state based on whether $R_A$ is installed on the motherboard. Once AC97_RESET goes from low to high, the state of the SDATA_IN2 is latched by $U_4$, preventing any further transitions in SDATA_IN2 from causing changes in CDC_DN_ENAB#.

Table 2 provides an example of the specifications for the CDC_DN_ENAB# control circuitry on the preferred CNR card.

Thus, with continuing reference to FIGS. 1–3, it can be seen that the riser 10 preferably includes a printed wiring board (PWB) 50 electrically connecting the riser codecs 18 to the initialization module 20. A connector 52 is coupled to the PWB 50 and enables electrical communication between the riser 10 and the motherboard 12. It should also be noted that the connector 52 preferably has a data delivery pin, where the data delivery pin enables the initialization module 20 to determine the codec support capability 26 of the codec controller 14. It is also preferred that the signal status indicates whether data is to be delivered from the primary codec 16 to the codec controller 14. Thus, if the pin is unterminated, the codec controller 14 does not support three codecs, and if the pin is terminated the codec controller 14 does support three codecs.

It will be appreciated that the initialization module 20 can be implemented through a variety of well-known software/hardware techniques in the industry. For example, the necessary code can be programmed into an electrically erasable programmable read-only memory (EEPROM), a microprocessor or other computer-readable storage medium.

Figure 7:
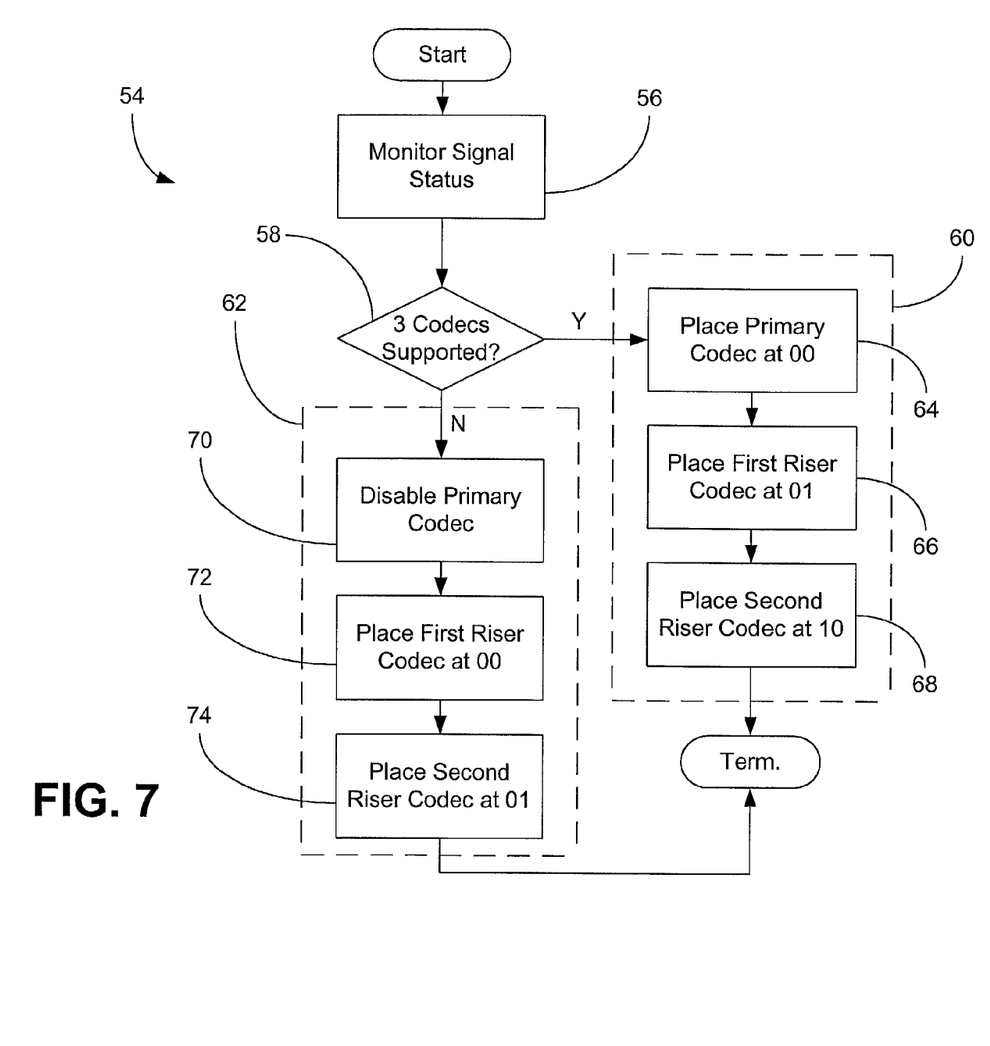
FIG. 7 is a flowchart demonstrating an example of a method of configuring a plurality of riser codecs in accordance with one embodiment of the present invention.

FIG. 7 illustrates the set of instructions that enables such a device to configure a plurality of riser codecs. Generally, it can be seen that the method 54 provides for monitoring the signal status at block 56, where the signal status indicates whether data is to be delivered from the primary codec to the codec controller. Block 58 provides for determining whether three codecs are supported based on the signal status. If so, a three-codec address structure is selected at block 60. Otherwise, a two-codec address structure is selected at block 62. Specifically, it is preferred that the three-codec address structure is selected by placing the primary codec at a first address at block 64, placing the first riser codec at a second address at block 66 and placing the second riser codec at a third address at block 68. On the other hand, block 62 provides for disabling the primary codec at block 70 when only two codecs are supported. Block 72 provides for placing the first riser codec at the first address, and block 74 provides for placing the second riser at the second address.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

The invention claimed is:

1. A riser comprising:
a plurality of riser codecs; and
an adaptive initialization module coupled to the riser codecs, the initialization module to configure the riser

TABLE 2

| Signal Name | Min | Max | Units | Comments |
| --- | --- | --- | --- | --- |
| SDATA_IN2 | | | | |
| Pull-up resistance | 90000 | 110000 | Ohms | Value for $R_D$ on CNR card |
| Pull-down resistance | — | 10000 | Ohms | Value for $R_C$ including chipset pull-down, on mother board |
| $V_{IL}$ | 0.5 | 0.9 | Volts | |
| $V_{IH}$ | 1.65 | 3.6 | Volts | |
| Leakage current | −45 | 45 | μAmps | Maximum combined leakage current allowed for all digital pins connected to SDATA_IN2 (excludes $R_C$ and $R_D$). |
| $T_{SU}$ | 100 | | nS | Setup time of SDATA_IN2 before rising edge of AC97_RESET |
| $T_H$ | 10 | | nS | Hold time of SDATA_IN2 before rising edge of AC97_RESET | codecs when the riser is connected to a motherboard having a codec controller and a primary codec;

said initialization module to automatically select between a first multi-codec configuration and a second multi-codec configuration based on a codec support capability of the codec controller.

2. The riser of claim 1 wherein the first multi-codec configuration is a two-codec configuration and the second multi-codec configuration is a three-codec configuration.

3. The riser of claim 2 wherein the initialization module includes:

a detection module to monitor a status of a signal; and an address controller coupled to the detection module and the riser codecs;

said address controller to select a two-codec address structure when the signal status indicates that the codec controller supports up to two codecs and a three-codec address structure when the signal status indicates that the codec controller supports up to three codecs.

4. The riser of claim 3 wherein the signal status indicates whether data is to be delivered from the primary codec to the codec controller in a two-codec configuration.

5. The riser of claim 3 wherein the three-codec address structure includes:

a first address corresponding to the primary codec;

a second address corresponding to a first riser codec; and a third address corresponding to a second riser codec.

6. The riser of claim 3 wherein the initialization module further includes an enabling mechanism coupled to the primary codec, the enabling mechanism to disable the primary codec when the codec controller supports up to two codecs.

7. The riser of claim 6 wherein the two-codec address structure includes:

a first address corresponding to a first riser codec; and a second address corresponding to a second riser codec.

8. The riser of claim 2 further including:

a printed wiring board electrically connecting the riser codecs to the initialization module; and a connector coupled to the printed wiring board, the connector enabling electrical communication between the riser and the motherboard.

9. The riser of claim 8 wherein the connector has a data delivery pin, the data delivery pin enabling the initialization module to determine the codec support capability of the codec controller.

10. An adaptive initialization module, the initialization module comprising:

a detection module to monitor a status of a signal; and an address controller coupled to the detection module;

said address controller to select a two-codec address structure when the signal status indicates that the codec controller supports up to two codecs and a three-codec address structure when the signal status indicates that the codec controller supports up to three codecs.

11. The initialization module of claim 10 wherein the signal status indicates whether data is to be delivered from a primary codec to the codec controller.

12. The initialization module of claim 10 wherein the three-codec address structure includes:

a first address corresponding to the primary codec;

a second address corresponding to a first riser codec; and a third address corresponding to a second riser codec.

13. The initialization module of claim 10 further including an enabling mechanism coupled to the primary codec, the enabling mechanism to disable the primary codec when the codec controller supports up to two codecs.

14. The initialization module of claim 13 wherein the two-codec address structure includes:

a first address corresponding to a first riser codec; and a second address corresponding to a second riser codec.

15. A riser comprising:

a plurality of riser codecs;

a detection module to monitor a status of a signal where the signal status indicates whether data is to be delivered from a primary codec to a codec controller;

an address controller coupled to the detection module and the riser codecs, said address controller to select a two-codec address structure when the control signal indicates that the codec controller supports up to two codecs and a three-codec address structure when the control signal indicates that the codec controller supports up to three codecs;

a printed wiring board electrically connecting the riser codecs to the detection module and address controller; and a connector coupled to the printed wiring board, the connector enabling electrical communication between the riser and a motherboard.

16. The riser of claim 15 wherein the connector has a data delivery pin, the data delivery pin enabling the riser to determine a codec support capability of the codec controller.

17. A method of configuring a plurality of riser codecs, the method comprising:

monitoring a status of a signal where the signal status indicates whether data is to be delivered from a primary codec to a codec controller;

selecting a two-codec address structure when the signal status indicates that the codec controller supports up to two codecs; and selecting a three-codec address structure when the signal status indicates that the codec controller supports up to three codecs.

18. The method of claim 17 further including determining whether a data delivery pin of a connector is terminated, the connector coupling a riser containing the riser codecs to a motherboard containing the primary codec and the codec controller.

19. The method of claim 17 further including:

placing the primary codec at a first address;

placing a first riser codec at a second address; and placing a second riser codec at a third address.

20. The method of claim 17 further including:

disabling the primary codec;

placing a first riser codec at a first address; and placing a second riser at a second address.

21. A computer-readable storage medium storing a set of instructions, the set of instructions capable of being executed by a processor to configure a plurality of riser codecs, the method comprising:

monitoring a status of a signal where the signal status indicates whether data is to be delivered from a primary codec to a codec controller;

selecting a two-codec address structure when the signal status indicates that the codec controller supports up to two codecs; and selecting a three-codec address structure when the signal status indicates that the codec controller supports up to three codecs.

22. The computer-readable storage medium of claim 21 wherein the method further includes determining whether a data delivery pin of a connector is terminated, the connector coupling a riser containing the riser codecs to a motherboard containing the primary codec and the codec controller.

* * * * *